United States Patent [19]

Fukui et al.

[11] 4,319,317

[45] Mar. 9, 1982

[54] D.C. POWER SUPPLY

[75] Inventors: Hiroshi Fukui; Hisao Amano, both of Hitachi, Japan

[73] Assignees: Hitachi, Ltd.; Hitachi Metals, Ltd., both of Tokyo, Japan

[21] Appl. No.: 169,770

[22] Filed: Jul. 17, 1980

[30] Foreign Application Priority Data

Aug. 22, 1979 [JP] Japan ............................... 54/106042

[51] Int. Cl.³ ........................................... H02M 7/00
[52] U.S. Cl. ..................................... 363/124; 363/37; 363/79
[58] Field of Search ................ 219/10.55 B; 328/262, 328/263; 363/27, 28, 34, 37, 41, 79, 21, 124; 307/252 C

[56] References Cited

U.S. PATENT DOCUMENTS 3,855,518 12/1974 Genuit ........................ 307/252 C X
4,037,271 7/1977 Keller ................................... 363/21
4,122,516 10/1978 Tokunaga ............................. 363/79

Primary Examiner—William M. Shoop
Attorney, Agent, or Firm—Craig and Antonelli

[57] ABSTRACT

A d.c. power supply for use in microwave ovens in which an a.c. voltage having a commercial frequency is rectified and then is chopped at a high frequency by means of a switching element. The resultant voltage is smoothed before being applied to the microwave oven. The voltage level of the commercial frequency voltage is sensed to produce a control pulse the duty ratio of which becomes greater as the voltage level becomes lower. The control pulse is used to control the ON-OFF operation of the switching element. By this circuit configuration, the microwave oven is supplied with a continuously-controllable d.c. voltage having a flat waveform.

21 Claims, 9 Drawing Figures

4,319,317

D.C. POWER SUPPLY

BACKGROUND OF THE INVENTION

This invention relates generally to a d.c. power source whose output voltage level or output power can be continuously varied, and particularly to a d.c. power source suitable for use in microwave ovens.

The d.c. power supply according to the present invention can be used not only for microwave ovens, but also for various kinds of apparatus which require a high voltage d.c. power source. For simplicity of explanation, the present description will be directed to a d.c. power supply to be used for driving a magnetron in a microwave oven; however, other applications of the present invention will be apparent therefrom.

Most microwave ovens which have been marketed to date use a d.c. power supply comprising a transformer for boosting the commercial a.c. voltage and a full-wave voltage rectification circuit for rectifying the boosted voltage. Such a d.c. power supply is relatively simple in its circuit configuration; however, it needs smoothing condensers of large capacity to obtain a d.c. voltage having a flat waveform. As a result, the d.c. power source accounts for a large part of the configuration of the microwave oven in both weight and volume. This fact causes a problem in the manufacture of small-sized microwave ovens.

In order to control the output power, the well-known d.c. power source has a plurality of condensers selectively connected with the full-wave voltage rectifier, so that the switching over of the connection of the condensers will change the output power in a stepwise manner. It is desirable, however, for the good cook of various kinds of foods which are different in shape and comprise different components to be able to continuously control the output power of the oven over a wide range.

SUMMARY OF THE INVENTION

A principal object of the invention resides in providing a d.c. power supply which is small in size and light in weight, suitable for use in a microwave oven.

Another object of the invention resides in providing a d.c. power supply whose output voltage or power can be changed continuously over a wide range.

A further object of the invention resides in providing a power supply in which various components, such as a transformer and a semiconductor element, of the power supply can be utilized to full capability of the characteristics thereof.

A still further object of the invention resides in providing a d.c. power supply for microwave ovens, the output of which can be controlled so as to prevent the destruction of the components of the power supply, to prevent the saturation of the transformer and to prevent an extraordinary oscillation of the magnetron.

In order to accomplish the objects mentioned above, the d.c. power supply of this invention comprises first circuit means for performing a full-wave rectification of the commercial power source voltage, second circuit means for chopping the thus-rectified voltage at a frequency higher than that of the commercial power source and third means for smoothing the high frequency voltage after boosting.

According to a feature of this invention, the transformer and smoothing condenser can be small in size and light in weight since they are designed to operate with a high frequency voltage.

Another feature of the present invention is to control the duty ratio of a control pulse which is utilized for chopping the rectified voltage, in such a manner that the duty ratio becomes greater as the voltage to be chopped becomes lower in level. According to this feature of the invention, a waveform of an average voltage obtained after chopping becomes relatively flat. Further, by changing the duty ratio of the control pulse, the average voltage thus obtained may be varied continuously in its level over a wide range.

Still another feature of the invention is to detect a current flow passing through the transformer and a semiconductor switching element used for chopping the rectified voltage. In response to the detected current, the duty ratio of the control pulse is controlled such that the current flow therethrough is always below an allowable level determined from the characteristics of the switching element and the transformer. This feature serves, of course, to effectively utilize the functions of the switching element and the transformer.

A still further feature of the invention is to detect the voltage applied to the magnetron of a microwave oven and the current flowing through the semiconductor switching element, and to stop the chopping operation of the switching element upon the detection of an overcurrent or overvoltage. This feature serves to prevent the elements of the power supply from breaking down and to prevent the extraordinary oscillation of the magnetron.

These and other objects, features and advantages of the present invention will become more apparent from the following detailed description of the preferred embodiments when read in conjunction with the accompanying drawings.

DETAILED DESCRIPTION OF THE PREFERRED EMBODIMENTS

Figure 1:
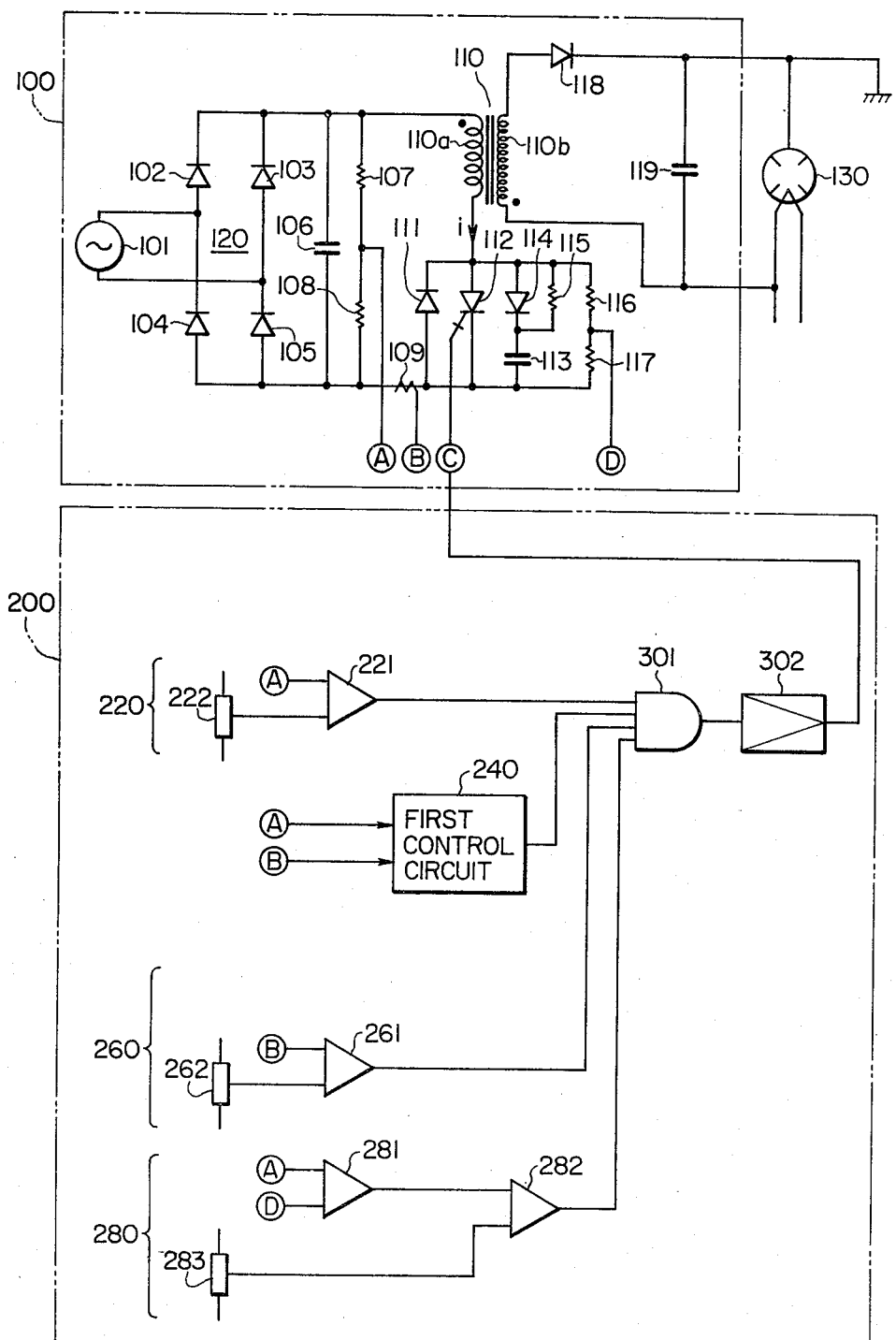
FIG. 1 shows a circuit diagram of a d.c. power supply according to an embodiment of the invention.

Referring now to FIG. 1 which shows an embodiment of the present invention, a d.c. power supply comprises a main circuit 100 and a control unit 200.

MAIN CIRCUIT 100

The functions of the main circuit 100 are to perform a full-wave rectification of a commercial frequency voltage, then to produce a high frequency voltage by chopping the rectified voltage, after which the high frequency voltage is boosted, and finally to produce a d.c. voltage by smoothing the boosted high frequency voltage.

Figure 3:
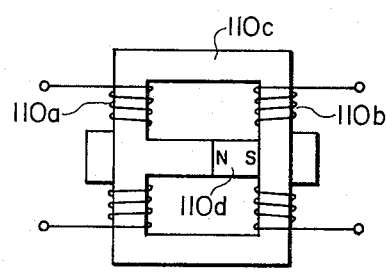
FIG. 3 shows an embodiment of a transformer for use in a d.c. power supply of the invention.

The voltage of 100 volts at 50 Hz or 60 Hz is applied from a power source 101 to a full-wave rectification circuit 120 comprising diodes 102, 103, 104 and 105. Across the output terminals of the full-wave rectification circuit 120, a primary winding 110a of a transformer 110 and the anode-cathode path of a switching element 112 are connected in series. The switching element 122 is required to have a large capacity and a large forward blocking voltage. In order to meet this requirement, it is desirable to use a gate turn-off thyristor (hereinafter referred to as GTO thyristor) as the switching element 112. The forward blocking voltage and the controllable current of the GTO thyristor are about 600 V and 60 A, respectively. The switching element 112 receives at its control electrode a relatively high frequency pulse from a control circuit 200, as will be mentioned later. The frequency of the control pulse is selected in this embodiment to be 20 kHz. As shown in FIG. 3, transformer 110 comprises a magnetic core 110c, a permanent magnet 110d placed within the magnetic path of the core 110c to provide a predetermined magnetic bias, a primary winding 110a and a secondary winding 110b wound on the magnetic core 110c. Generally, the transformer is supplied with an alternating current so that the magnetic characteristic curve of the transformer extending both in the positive and negative regions can be effectively utilized. On the other hand, the transformer 110 of FIG. 1 receives a d.c. voltage. In order to utilize the full range of the characteristic curve of the magnetic core of the transformer, it is desirable to provide the core with a predetermined magnetic bias, as mentioned above. By using the configuration as shown in FIG. 3, it becomes possible to reduce the size of the transformer to as small as one-half that of the conventional transformer.

Across the output terminals of the rectifier circuit 120, a condenser 106 is connected. It should be noted that the condenser 106 is connected not to smooth the rectified voltage, but to decrease the impedance of the commercial frequency power source 101, as viewed from the side of the switching element 112. As described before, since the switching element 112 is driven by a control pulse of 20 kHz, a voltage of the same frequency may be developed across the anode and the cathode of the switching element 112. The reactance of the commercial frequency power source 101 becomes about four hundred times that at a frequency of 20 kHz as compared to that at 50 Hz or 60 Hz. Accordingly, the high frequency power developed across the anode and the cathode of the switching element 112 cannot be effectively transmitted through the transformer 110 to the magnetron 130. It is, therefore, necessary to reduce the impedance as viewed from the switching element 112 to the power source 101. The condenser 106 is selected in this embodiment to have a capacitance of several microfarads, which is very small as compared to that of the usual smoothing condensers. Two resistors 107 and 108 are connected in series across the terminals of the condenser 106. The junction point between the resistors 107 and 108 is connected to a terminal Ⓐ. These resistors 107 and 108 are used to detect the voltage developed across the series circuit comprising the primary winding 110a of the transformer 110 and the switching element 112. On the other hand, the current flowing through the series circuit formed by the transformer 110 and the switching element 112 is detected by means of a sensor 109, such as a shunt, and the output of sensor 109 is supplied through a terminal Ⓑ to the control circuit 200.

Across the anode and the cathode of the switching element 112, a diode 111 is connected. Further, a diode 114 and a condenser 113 are connected in series between the anode and the cathode of the switching element 112. Across the terminals of the diode 114, a resistor 115 is connected. The diode 114, resistor 115 and condenser 113 forms a so-called snapper circuit which functions to protect the switching element 112 from a high voltage which will occur at the time the switching element 112 turns off. When the switching element 112 turns off, the anode voltage v increases abruptly. If the amount of dv/dt (where t indicates time) is over a predetermined value, then the switching element 112 may be destroyed. In order to decrease the value of dv/dt, the embodiment provides for a current flow passing for a while through the diode 114 and the condenser 113 at the time the switching element 112 turns off. The charges stored in the condenser 113 are discharged through the resistor 115 when the switching element 112 turns on.

In parallel with the anode-cathode path of the switching element 112, a series circuit of resistors 116 and 117 is connected. The junction point between the resistors 116 and 117 is connected to a terminal Ⓓ. These resistors 116 and 117 are used to detect the voltage developed across the anode and cathode of the switching element 112. The voltage across the secondary winding 110b of the transformer 110 is applied through a diode 118 to the magnetron 130 of the microwave oven. A condenser 119 functions to smooth the high frequency voltage applied to the magnetron 130. In this embodiment, the condenser 119 is selected to have a capacitance of about 0.1 μF, and the electric power and the voltage applied to the magnetron 130 are designed to be 1 kW and 4 kV, respectively.

Figure 4A:
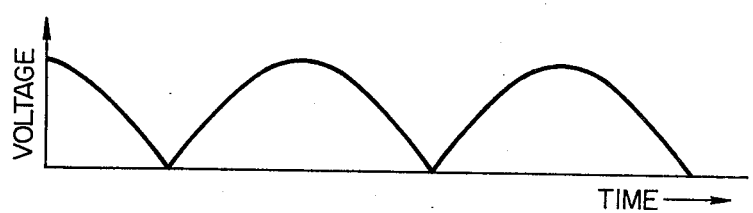
FIG. 4 shows waveforms of an input to and an output from the d.c. power supply of the present invention.
Figure 4B:
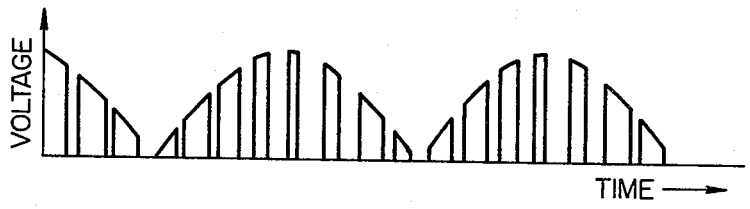

A description will now be made of the operation of the main circuit 100. The voltage of the commercial frequency power source 101 is rectified by means of the full-wave rectification circuit 120. As a result, a voltage appears across the condenser 106 as shown in FIG. 4(A). This voltage is chopped at a frequency of 20 kHz by means of the switching element 112. The duty ratio of the chopping control pulse is made large when the magnitude of the rectified voltage is low while the duty ratio is made small when the magnitude of the voltage is high. By this operation, a voltage having the waveform as shown in FIG. 4(B) appears at the anode of the switching element 112. When the switching element 112 is in a conductive state, the exciting current of the transformer 110 increases. Across the secondary winding 110b of the transformer 110, a voltage is developed in a direction which results in the diode 118 being cut off. Therefore, the secondary circuit of the transformer 110 is in an open state.

Figure 4C:
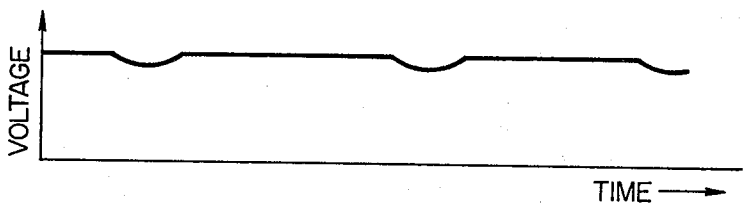

When the switching element 112 turns off, the primary circuit of the transformer 110 becomes open, during which the diode 118 is rendered conductive and the energy stored in the secondary winding of the transformer 110 is applied to the magnetron 130. The waveform of the voltage applied to the magnetron 130 is as shown in FIG. 4(C).

Control Unit 200

The control unit 200 functions to control the ON-OFF operation of the switching element 112 of the main circuit 100. This control unit 200 includes first control circuit 240, a second control circuit 220, third control circuit 260 and fourth control circuit 280.

The first control circuit 240 functions to vary the duty ratio of the control pulse in accordance with the rectified voltage level and the current flowing through the switching element 112. The second control circuit 220 is provided to limit the period of time during which the switching element 112 performs its ON-OFF operation, in accordance with the rectified voltage level. This circuit 220 can be omitted depending upon the manner of control of the duty ratio. The third control circuit 260 functions to cut off the switching element 112 irrespective of the state of the output control pulse from the first control circuit 240 when the current through the transformer 110 and the switching element 112 has exceeded a predetermined value. The fourth control circuit 280 is provided to cut off the switching element 112 irrespective of the state of the output control pulse from the first control circuit 240 when the applied voltage to the magnetron 130 or the switching element 112 has exceeded a predetermined value. The description will now be made of the details of each of the control circuits.

(1) Duty Ratio Control

In the disclosed embodiment of the present invention, the first control circuit 240 can perform four kinds of functions. The first function is to vary the duty ratio of the control pulse applied to the switching element 112 in response to the instantaneous voltage level of the commercial frequency power source. In order to obtain an output voltage having as flat a level as possible from the commercial frequency voltage, it is necessary to change the duty ratio of the control pulse in such a manner that the chopping operation of the switching element can be performed in response to the instantaneous voltage level of the commercial frequency power source, as shown in FIG. 4(B). For this purpose, the first control circuit 240 controls the duty ratio of the control pulse as shown in curve Da in FIG. 5. In this figure the duty ratio of the control pulse gradually decreases as the level of the commercial frequency voltage Va increases within the phase angle from 0° to 90°. Further, the duty ratio gradually increases as the level of the voltage Va decreases within the phase angle from 90° to 180°.

Figure 5:
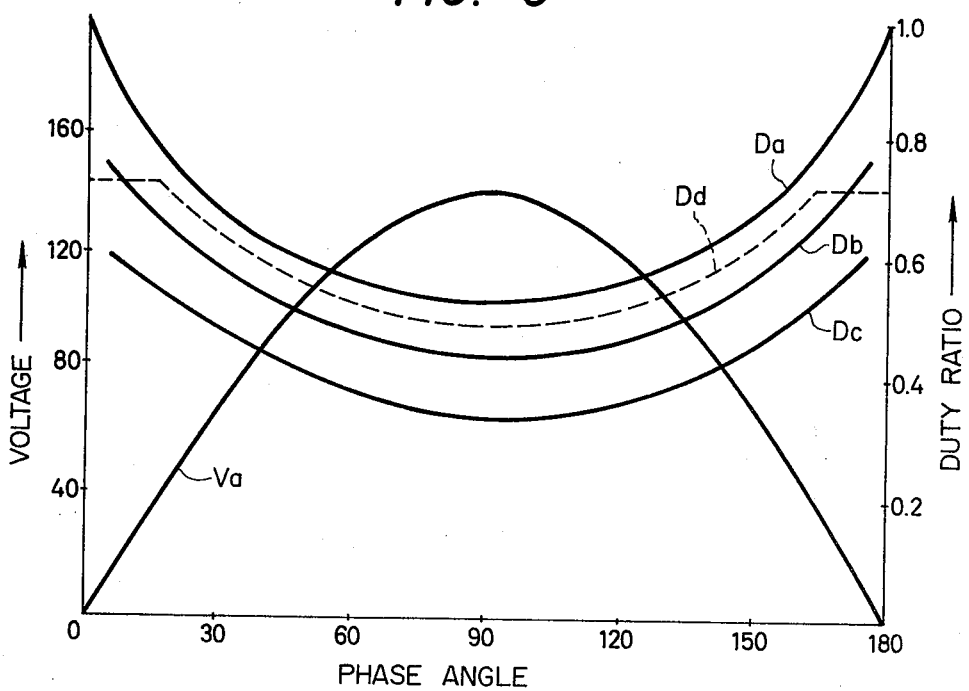
FIG. 5 shows changes in a duty ratio of a control pulse as the phase angle of the input voltage changes.

The second function of the first control circuit 240 is to control the duty ratio of the control pulse in such a way that the characteristic curve of the duty ratio can be shifted in parallel, as shown at Da, Db, and Dc, in FIG. 5 by changing a variable resistor. When the duty ratio of the control pulse is varied as shown by the characteristic curve Db, the average duty ratio over one cycle of the voltage becomes less than when it is varied as shown by the curve Da. As a result, the electric power applied to the magnetron 130 can be reduced. The power can be further reduced when the duty ratio of the control pulse is varied in accordance with the characteristic curve Dc. Accordingly, the second function serves to continuously control the electric power supplied to the load.

The third function of the first control circuit 240 is to fix the duty ratio of the control pulse as shown at Dd in FIG. 5 when the voltage level Va of the commercial frequency power source is below a predetermined value. Since the change in duty ratio results in a very small change in the voltage and power supplied to the load, the effect of the duty ratio control is small within the range of low voltage level Va. Of course, the duty ratio control at a fixed value can bring more stable and simpler operation than the variable duty ratio control.

The fourth function of the first control circuit 240 is to control the duty ratio of the control pulse in response to the current flow through the transformer 110 and the switching element 112 when the current is over a predetermined value. Upon the detection of the overcurrent, the duty ratio of the control pulse is restricted in accordance with the detected current, thereby to reduce the current flow of the main circuit 100 and prevent the saturation of the transformer 110 as well as breakdown of the switching element 112.

Figure 2:
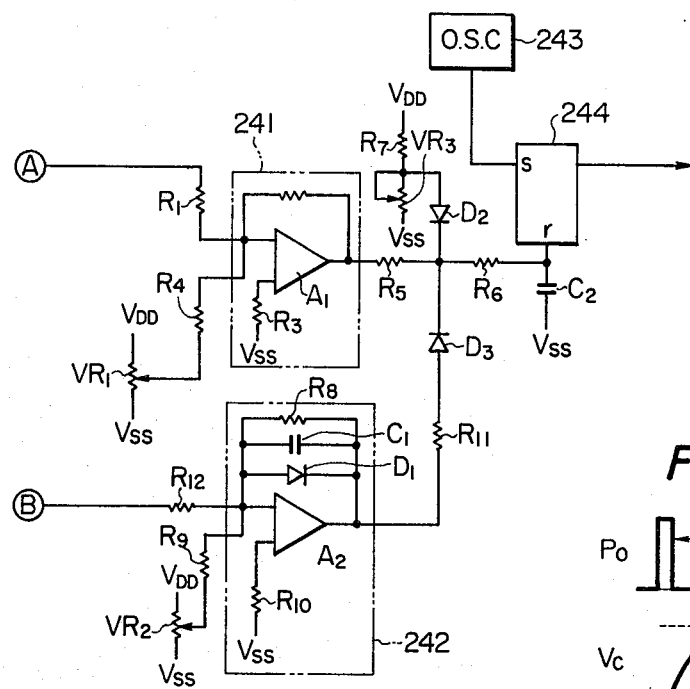
FIG. 2 shows an embodiment of a first control circuit of a control unit shown in FIG. 1.

Referring to FIG. 2, the first control circuit 240 which performs the functions mentioned above comprises a high frequency pulse generator 243, a multivibrator 244 which is set by the high frequency pulse from pulse generator 243, and circuit means for producing a reset signal supplied to the multivibrator 244. The generator 243 generates pulses Po at a frequency which is higher than that of the commercial frequency power source 101. In this embodiment, this frequency is selected to be 20 kHz. The high frequency pulses are applied to the set terminal of the multivibrator 244.

Figure 2A:
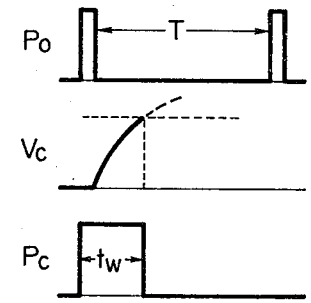
FIG. 2a shows waveforms of signals appearing at respective portions of FIG. 2.

The voltage appearing at the terminal Ⓐ of the main circuit 100 is applied to a linear amplifier 241 through a resistor R1. The linear amplifier 241 comprises an amplifier A1 and resistors R2 and R3. The output of the amplifier 241 is applied through resistors R5 and R6 to a condenser C2. When the voltage Vc across the condenser C2 reaches a predetermined level, the multivibrator 244 is reset. As a result, the multivibrator 244 produces an output pulse Pc, as shown in FIG. 2a. The higher the input voltage at the terminal Ⓐ, the more promptly the voltage Vc across the condenser C reaches a predetermined level so that the width tw of the pulse Pc becomes narrow. In other words, the duty ratio (tw/T) of the output pulse Pc becomes small as the level of the commercial frequency voltage becomes high. In this way, the first function mentioned above is achieved.

The voltage which appears at a movable terminal of a variable resistor VR1 connected between d.c. voltage sources $V_{SS}$ and $V_{DD}$ is superimposed on the voltage at the terminal Ⓐ and the resultant voltage is applied to the linear amplifier 241. This configuration serves to vary the bias voltage applied to the amplifier 241. The variable resistor VR1 is used for two purposes. One is to set the current flowing through the primary winding 110a of the transformer 110 and the switching element 112 at an allowable maximum value which is determined from the characteristics of those elements mentioned above, thereby to utilize effectively the capability of the elements.

If the current through the primary winding 110a of the transformer 110, the cut-off current through the switching element 112, and the average current therethrough are denoted as $I_{L1}$, $I_{off}$ and $I_{av}$, respectively, the following relationships must be satisfied.

$$\left.\begin{array}{c} I_{L1} \leqq I_{L1m} \\ I_{off} \leqq I_{offm} \\ I_{av} \leqq I_{avm} \end{array}\right\} \quad (1)$$

where $I_{L1m}$: saturation exciting current of the transformer 110

$I_{offm}$: controllable maximum current of the switching element 112

$I_{avm}$: rated average current of the switching element 112

The current i flowing through the main circuit 100 can be set at the maximum value which meets all the relationships expressed by the equation (1), by the adjustment of the variable resistor VR1.

The other purpose for using the variable resistor VR1 is to perform the second function mentioned above, namely, to vary continuously the electric power supplied to the magnetron. By adjusting the bias voltage applied to the linear amplifier 241, the duty ratio of the control pulse Pc can be varied. As a result, the characteristic curve of the duty ratio as related to the commercial frequency source voltage may be shifted in parallel, for example, from Da to Db and from Db to Dc, as shown in FIG. 5. It will be easily understood that such parallel shift of the characteristic curve results in a change in the output power supplied to the magnetron.

A resistor $R_7$ and a variable resistor $VR_3$ are connected in series between the d.c. voltage sources $V_{DD}$ and $V_{SS}$. The voltage across the variable resistor $VR_3$ is applied through a diode $D_2$ to the point of connection between resistors $R_5$ and $R_6$. The variable resistor $VR_3$ is used for achieving the third function mentioned before. When the output voltage of the amplifier 241 is greater than the voltage determined by means of the variable resistor $VR_3$, the output voltage is applied across the condenser $C_2$. On the other hand, the d.c. voltage determined by means of the variable resistor $VR_3$ is greater than the output voltage of the amplifier 241, the d.c. voltage is applied through the diode $D_2$ to the condenser $C_2$. In the latter case, the period of time from the time when the multivibrator has been set to the time when it has been reset is fixed so that the duty ratio tw/T of the control pulse is also fixed.

The current flow i of the main circuit 100, detected by the shunt 109, is applied through a resistor $R_{12}$ to the input of a linear amplifier 242, which comprises an amplifier $A_2$, a diode $D_1$, a condenser $C_1$ and resistors $R_8$ and $R_{10}$. The linear amplifier 242 generates an output voltage in proportion to an input current, which output voltage is applied through a resistor $R_{11}$ and a diode $D_3$ to the point of connection between the resistors $R_5$ and $R_6$. A bias voltage is delivered from a variable resistor $VR_2$ connected between the d.c. voltage sources $V_{DD}$ and $V_{SS}$, which bias voltage is applied to the linear amplifier 242 through a resistor $R_9$. The output voltage of the amplifier 242 is used for performing the fourth function mentioned above. That is to say, when the current flow detected by the shunt 109 is over a predetermined value, the output voltage of the linear amplifier 242 becomes greater than that of the amplifier 241 and is applied across the condenser $C_2$. As a result, the pulse width of the control pulse Pc is reduced in response to the detected current value irrespective of the level of the commercial frequency voltage source.

The output pulse Pc of the multivibrator 244 is applied as the control pulse to the switching element 112 of the main circuit through an AND gate 301 and an amplifier 302, as shown in FIG. 1.

(2) Duration Control of the ON-OFF Operation

Experiments by the inventors have shown that the efficiency of the main circuit 100 is over 80% when the voltage of the commercial frequency power source 101 becomes more than 60 V, while it decreases abruptly when the voltage is below 60 V. This is because, when the voltage level of the a.c. voltage source 101 is low, the duty ratio control is performed in such a manner that the average current through the switching element 112 is increased to maintain the output power constant. As a result, power losses of the circuit elements, such as the switching element 112, are also increased. In order to operate the d.c. power supply always at a high efficiency, it is desirable to stop the chopping operation of the switching element 112 when the voltage level of the a.c. voltage source 101 is lower than a predetermined value. The second control circuit 220 serves to perform the chopping operation of the switching element 112 only when the voltage level is over a predetermined value.

The voltage synchronized in phase with the a.c. voltage of the commercial frequency voltage source 101 is detected at the terminal Ⓐ and is applied to a comparator 221 as one of its inputs. As the other input of the comparator 221, a constant voltage is applied which is set by means of a potentiometer 222. The comparator 221 produces a logical "1" when the commercial frequency voltage level exceeds the set value, and produces a logical "0" when it is below the set value. Since the output of the comparator 221 is applied to the AND gate 301, the gate 301 functions to stop the transmission of the control pulse from the first control circuit 240 to the main circuit 100 during the period of time during which the voltage level of the a.c. voltage source 101 is lower than the predetermined value. Accordingly, during this period of time, the switching element 112 is in a cut-off state. Although the apparatus of the present invention can be operated without the second control circuit 220, it is desirable to provide with this circuit 220 for the high efficiency of the main circuit 100.

(3) The Control to Stop the Chopping Operation When an Overcurrent Condition Exists As mentioned before, when an overcurrent condition is detected in the main circuit 100, the first control circuit 240 controls the duty ratio of the control pulse to cause it to become small so that damage to the switching element 112 and other elements can be prevented. However, in the case where the current flow i through the main circuit 100 exceeds a predetermined value, the duty ratio control will not be enough for the protection of the circuit elements. In this case, it is desirable to stop the chopping operation of the switching element 112. Third control circuit 260 is provided to meet this requirement. The current flow i detected by means of the shunt 109 is applied to a comparator 261 as one of its inputs. As the other input of the comparator 261, a constant current is applied which is produced by a current value setting device 262. The comparator 261 generates a logical "1" only when the detected current i is less than the set constant value, otherwise it produces a logical "0". Accordingly, when the overcurrent is detected in the main circuit 100, the comparator 261 produces a logical "0" which serves to close the AND gate 301, thereby to stop the chopping operation of the switching element 112.

(4) The Control to Stop the Chopping Operation When an Overvoltage is Detected The magnetron used for the microwave oven will begin a normal oscillation when the voltage applied to the anode thereof reaches a predetermined level, for example, 3.5 kV. In the case where the input voltage becomes greater than a certain value, 5.1 kV for example, or the anode voltage is applied when the preheating of the filament is insufficient, an abnormal oscillation called a run-away or moding will occur. When the abnormal oscillation occurs, a high voltage is induced which is as high as several times the normal operation voltage, and thereby, circuit elements such as the magnetron 130, the high voltage diode 118, the transformer 110 and the switching element 112 will be damaged. The fourth control circuit 280 is provided to prevent the damages to those elements.

Since it is not easy to directly detect the high voltage applied to the magnetron 130, the primary voltage of the transformer 110 is detected according to the embodiment of the present invention. At the terminal Ⓐ, a voltage appears which corresponds to the sum of the primary voltage of the transformer 110 and the voltage across the switching element 112. On the other hand, a voltage proportional to that across the switching element 112 appears at the terminal Ⓓ. A differential amplifier 281 is provided to obtain the difference between the voltages at the terminal Ⓐ and the terminal Ⓓ, which, of course, corresponds to the primary voltage of the transformer 110. A potentiometer 283 is provided to produce a voltage to be compared with the detected primary voltage of the transformer 110, which corresponds to a predetermined level of the load voltage. A comparator 282 is supplied with both the output voltage of the differential amplifier 281 and the set value of the potentiometer 283 to produce a logical "1" when the former is less than the latter and to generate a logical "0" when the former is greater than the latter.

In the case where the load voltage becomes abnormally high, so that the primary voltage of the transformer 110 becomes greater than the set value of the potentiometer 283, the comparator 282 produces a logical "0" which functions to close the AND gate 301. As a result, the gate 301 inhibits the transmission of the control pulse from the first control circuit 240 to the main circuit 100. Therefore, the switching element 112 is rendered cut-off so that the voltage applied to the magnetron 130 can be reduced.

The fourth control circuit 280 mentioned above is used also for preventing the switching element 112 from being damaged. When the rated forward blocking voltage of the switching element 112 and the voltage thereacross are expressed as $V_{b1m}$ and $V_{b1}$, respectively, it is necessary to meet the following relationship:

$$V_{b1} \leqq V_{b1m} \qquad (2)$$

For this requirement, the potentiometer 283 is preliminarily set to produce an appropriate voltage corresponding to $V_{b1m}$. When the detected voltage becomes greater than the set value $V_{b1m}$, the comparator 282 produces a logical "0" so as to close the AND gate 301. Therefore, it is possible to prevent the switching element 112 from breaking down.

Figure 6:
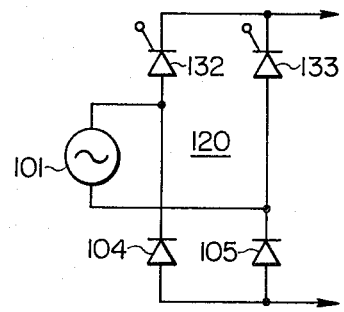
FIG. 6 is a circuit diagram of a rectifier for use in the d.c. power supply according to the invention.

Although one embodiment of the present invention has been described above, it is to be understood that various modifications can be made without departing from the spirit of the invention. By way of an example, thyristors 132, 133 can be utilized for portions of the diodes 102, 103, 104 and 105, for example, the diodes 102, 103 as shown in FIG. 6. In this case, an average voltage delivered from the diode bridge can be easily varied by controlling the firing angles of the thyristors 132 and 133.

While we have shown and described several embodiments in accordance with the present invention, it is understood that the invention is not limited to the details shown and described herein but is susceptible of numerous changes and modifications as known to those of ordinary skill in the art, and we therefore do not wish to be limited to the details shown and described herein but intend to cover all such changes and modifications obvious to one of ordinary skill in the art.

What is claimed is:

1. A d.c. power supply comprising a main circuit and a control unit;
    said main circuit including a voltage source providing an a.c. voltage having a predetermined first frequency; a rectifier circuit connected to said voltage source for converting said a.c. voltage into a d.c. voltage; and a switching element connected to said rectifier circuit and having an anode, a cathode and a control electrode for chopping said d.c. voltage at a predetermined constant second frequency higher than said first frequency in response to a control pulse applied to said control electrode; and
    said control unit including a first control circuit for controlling the ON-OFF operation of the switching element of said main circuit, said first control circuit comprising first means for sensing the level of said d.c. voltage at an output terminal of said rectifier circuit, second means for generating a pulse signal having said constant second frequency, third means for controlling a duty ratio of said pulse signal in response to the output of the first means in such a manner that the duty ratio becomes greater as the output of the first means becomes lower, and means for applying said pulse signal to the control electrode of said switching element.

2. A d.c. power supply having a main circuit and a control unit;
    said main circuit comprising
        a voltage source providing an a.c. voltage having a predetermined first frequency;
        a rectifier circuit connected to said voltage source for converting said a.c. voltage into a d.c. voltage;
        a switching element connected to said rectifier circuit and having an anode, a cathode and a control electrode for chopping said d.c. voltage at a predetermined constant second frequency higher than said first frequency in response to a control pulse applied to said control electrode;
        a transformer having a primary winding and a secondary winding, said primary winding being connected to said switching element such that a chopped current flows in one direction therethrough; and
    smoothing means connected to the secondary winding of said transformer to smooth the voltage developed thereacross;
    said control unit comprising a first control circuit for controlling the ON-OFF operation of the switching element of said main circuit, said first control circuit including first means for sensing the level of said d.c. voltage at an output terminal of said rectifier circuit, second means for generating a pulse signal having said constant second frequency, third means for controlling a duty ratio of said pulse signal in response to the output of the first means in such a manner that the duty ratio becomes greater as the output of the first means becomes lower, and means for applying said pulse signal to the control electrode of said switching element.

3. A d.c. power supply as defined in claim 2, wherein said first control circuit further comprises fourth means for applying a selectively-variable voltage to said third means so that the duty ratio of said pulse signal is controlled on the basis of said variable voltage in addition to the sensed d.c. voltage level.

4. A d.c. power supply as defined in claim 2, wherein said first control circuit further comprises fifth means for generating a predetermined constant voltage and means for applying the constant voltage to said third means in place of the output of the first means when the constant voltage becomes greater than the output of the first means, so that the duty ratio of the pulse signal becomes constant.

5. A d.c. power supply as defined in claim 2, wherein the first control circuit further comprises means for detecting the current flow through the main circuit, means for producing a voltage corresponding to the detected current flow and means for applying the voltage corresponding to the detected current flow to said third means in place of the output of said first means when the voltage corresponding to the detected current flow becomes greater than the output of said first means, so that the duty ratio of the pulse signal may vary in accordance with the current flow of the main circuit.

6. A d.c. power supply as defined in claim 2, wherein said control unit further comprises a second control circuit including means for producing a predetermined constant voltage, comparing means for comparing the sensed, d.c. voltage obtained by said first means with said predetermined constant voltage to produce an output when the sensed d.c. voltage is greater than said predetermined constant voltage, and gate means connected to receive outputs of said comparing means and said first control circuit for inhibiting the application of the output of the first control circuit to the control electrode of said switching element in response to the output of said comparing means.

7. A d.c. power supply as defined in claim 2, wherein said control unit further comprises a third control circuit including means for producing a predetermined constant current, detecting means for detecting the current flow passing through said main circuit, comparing means for comparing said detected current with said predetermined constant current to generate an output when the detected current becomes greater in level than the predetermined constant current, and gate means connected to receive the outputs of the comparing means and the first control circuit for inhibiting the application of the output of the first control circuit to the control electrode of said switching element in response to the output of the comparing means.

8. A d.c. power supply as defined in claim 2, wherein the control unit further comprises a fourth control circuit including detecting means for detecting the voltage developed across the primary winding of said transformer and a voltage across said switching element, means for producing a predetermined voltage, comparing means for comparing at least one of the detected voltages with said predetermined voltage to produce an output when one becomes greater than the other, and gate means connected to receive outputs of said comparing means and said first control circuit for inhibiting the application of the output of said first control circuit to the control electrode of said switching element in response to the output of said comparing means.

9. A d.c. power supply as defined in claim 1 or 2, wherein the rectifier circuit comprises a diode bridge including at least one thyristor.

10. A d.c. power supply as defined in claim 2, wherein a condenser is connected across the rectifier circuit, said condenser being selected to have a value which exhibits a low impedance at said second frequency.

11. A d.c. power supply as defined in claim 1 or 2, wherein the switching element comprises a gate turn-off thyristor.

12. A d.c. power supply as defined in claim 2, wherein said transformer comprises a magnetic core defining a magnetic path on which the primary and secondary windings are wound, said magnetic path including a permanent magnet to provide a predetermined magnetic bias with respect to magnetic flux due to a current flowing through the primary winding.

13. A d.c. power supply comprising a main circuit and a control unit;

said main circuit including a voltage source providing an a.c. voltage having a predetermined first frequency; a rectifier circuit connected to said voltage source for converting said a.c. voltage into a d.c. voltage; and a switching element connected to said rectifier circuit and having an anode, a cathode and a control electrode for chopping said d.c. voltage at a predetermined second frequency higher than said first frequency in response to a control pulse applied to said control electrode; and said control unit including a first control circuit for controlling the ON-OFF operation of the switching element of said main circuit, said first control circuit comprising first means for sensing the level of said d.c. voltage, second means for generating a pulse signal having said second frequency, third means for controlling a duty ratio of said pulse signal in response to the output of the first means in such a manner that the duty ratio becomes greater as the output of the first means becomes lower, and means for applying said pulse signal to the control electrode of said switching element, wherein said first control circuit further comprises fourth means for applying a selectively-variable voltage to said third means so that the duty ratio of said pulse signal is controlled on the basis of said variable voltage in addition to the sensed d.c. voltage level.

14. A d.c. power supply comprising a main circuit and a control unit;

said main circuit including a voltage source providing an a.c. voltage having a predetermined first frequency; a rectifier circuit connected to said voltage source for converting said a.c. voltage into a d.c. voltage; and a switching element connected to said rectifier circuit and having an anode, a cathode and a control electrode for chopping said d.c. voltage at a predetermined second frequency higher than said first frequency in response to a control pulse applied to said control electrode; and said control unit including a first control circuit for controlling the ON-OFF operation of the switching element of said main circuit, said first control circuit comprising first means for sensing the level of said d.c. voltage, second means for generating a pulse signal having said second frequency, third means for controlling a duty ratio of said pulse signal in response to the output of the first means in such a manner that the duty ratio becomes greater as the output of the first means becomes lower, and means for applying said pulse signal to the control electrode of said switching element, wherein said first control circuit further comprises fifth means for generating a predetermined constant voltage and means for applying the constant voltage to said third means in place of the output of the first means when the constant voltage becomes greater than the output of the first means, so that the duty ratio of the pulse signal becomes constant.

15. A d.c. power supply comprising a main circuit and a control unit;

said main circuit including a voltage source providing an a.c. voltage having a predetermined first frequency; a rectifier circuit connected to said voltage source for converting said a.c. voltage into a d.c. voltage; and a switching element connected to said rectifier circuit and having an anode, a cathode and a control electrode for chopping said d.c. voltage at a predetermined second frequency higher than said first frequency in response to a control pulse applied to said control electrode; and said control unit including a first control circuit for controlling the ON-OFF operation of the switching element of said main circuit, said first control circuit comprising first means for sensing the level of said d.c. voltage, second means for generating a pulse signal having said second frequency, third means for controlling a duty ratio of said pulse signal in response to the output of the first means in such a manner that the duty ratio becomes greater as the output of the first means becomes lower, and means for applying said pulse signal to the control electrode of said switching element, wherein the first control circuit further comprises means for detecting the current flow through the main circuit, means for producing a voltage corresponding to the detected current flow and means for applying the voltage corresponding to the detected current flow to said third means in place of the output of said first means when the voltage corresponding to the detected current flow becomes greater than the output of said first means, so that the duty ratio of the pulse signal may vary in accordance with the current flow of the main circuit.

16. A d.c. power supply comprising a main circuit and a control unit;

said main circuit including a voltage source providing an a.c. voltage having a predetermined first frequency; a rectifier circuit connected to said voltage source for converting said a.c. voltage into a d.c. voltage; and a switching element connected to said rectifier circuit and having an anode, a cathode and a control electrode for chopping said d.c. voltage at a predetermined second frequency higher than said first frequency in response to a control pulse applied to said control electrode; and said control unit including a first control circuit for controlling the ON-OFF operation of the switching element of said main circuit, said first control circuit comprising first means for sensing the level of said d.c. voltage, second means for generating a pulse signal having said second frequency, third means for controlling a duty ratio of said pulse signal in response to the output of the first means in such a manner that the duty ratio becomes greater as the output of the first means becomes lower, and means for applying said pulse signal to the control electrode of said switching element, wherein said control unit further comprises a second control circuit including means for producing a predetermined constant voltage, comparing means for comparing the sensed d.c. voltage obtained by said first means with said predetermined constant voltage to produce an output when the sensed d.c. voltage is greater than said predetermined constant voltage, and gate means connected to receive outputs of said comparing means and said first control circuit for inhibiting the application of the output of the first control circuit to the control electrode of said switching element in response to the output of said comparing means.

17. A d.c. power supply comprising a main circuit and a control unit;

said main circuit including a voltage source providing an a.c. voltage having a predetermined first frequency; a rectifier circuit connected to said voltage source for converting said a.c. voltage into a d.c. voltage; and a switching element connected to said rectifier circuit and having an anode, a cathode and a control electrode for chopping said d.c. voltage at a predetermined second frequency higher than said first frequency in response to a control pulse applied to said control electrode; and said control unit including a first control circuit for controlling the ON-OFF operation of the switching element of said main circuit, said first control circuit comprising first means for sensing the level of said d.c. voltage, second means for generating a pulse signal having said second frequency, third means for controlling a duty ratio of said pulse signal in response to the output of the first means in such a manner that the duty ratio becomes greater as the output of the first means becomes lower, and means for applying said pulse signal to the control electrode of said switching element, wherein said control unit further comprises a third control circuit including means for producing a predetermined constant current, detecting means for detecting the current flow passing through said main circuit, comparing means for comparing said detected current with said predetermined constant current to generate an output when the detected current becomes greater in level than the predetermined constant current, and gate means connected to receive the outputs of the comparing means and the first control circuit for inhibiting the application of the output of the first control circuit to the control electrode of said switching element in response to the output of the comparing means.

18. A d.c. power supply having a main circuit and a control unit;

said main circuit comprising
a voltage source providing an a.c. voltage having a predetermined first frequency;
a rectifier circuit connected to said voltage source for converting said a.c. voltage into a d.c. voltage;
a switching element connected to said rectifier circuit and having an anode, a cathode and a control electrode for chopping said d.c. voltage at a predetermined second frequency higher than said first frequency in response to a control pulse applied to said control electrode;

a transformer having a primary winding and a secondary winding, said primary winding being connected to said switching element such that a chopped current flows in one direction therethrough; and smoothing means connected to the secondary winding of said transformer to smooth the voltage developed thereacross;

said control unit comprising a first control circuit for controlling the ON-OFF operation of the switching element of said main circuit, said first control circuit including first means for sensing the level of said d.c. voltage, second means for generating a pulse signal having said second frequency, third means for controlling a duty ratio of said pulse signal in response to the output of the first means in such a manner that the duty ratio becomes greater as the output of the first means becomes lower, and means for applying said pulse signal to the control electrode of said switching element, wherein the control unit further comprises a fourth control circuit including detecting means for detecting the voltage developed across the primary winding of said transformer and a voltage across said switching element, means for producing a predetermined voltage, comparing means for comparing at least one of the detected voltages with said predetermined voltage to produce an output when one becomes greater than the other, and gate means connected to receive outputs of said comparing means and said first control circuit for inhibiting the application of the output of said first control circuit to the control electrode of said switching element in response to the output of said comparing means.

19. A d.c. power supply comprising a main circuit and a control unit;

said main circuit including a voltage source providing an a.c. voltage having a predetermined first frequency; a rectifier circuit connected to said voltage source for converting said a.c. voltage into a d.c. voltage; and a switching element connected to said rectifier circuit and having an anode, a cathode and a control electrode for chopping said d.c. voltage at a predetermined second frequency higher than said first frequency in response to a control pulse applied to said control electrode; and said control unit including a first control circuit for controlling the ON-OFF operation of the switching element of said main circuit, said first control circuit comprising first means for sensing the level of said d.c. voltage, second means for generating a pulse signal having said second frequency, third means for controlling a duty ratio of said pulse signal in response to the output of the first means in such a manner that the duty ratio becomes greater as the output of the first means becomes lower, and means for applying said pulse signal to the control electrode of said switching element, wherein a condenser is connected across the rectifier circuit, said condenser being selected to have a value which exhibits a low impedance at said second frequency.

20. A d.c. power supply having a main circuit and a control unit;

said main circuit comprising a voltage source providing an a.c. voltage having a predetermined first frequency;

a rectifier circuit connected to said voltage source for converting said a.c. voltage into a d.c. voltage;

a switching element connected to said rectifier circuit and having an anode, a cathode and a control electrode for chopping said d.c. voltage at a predetermined second frequency higher than said first frequency in response to a control pulse applied to said control electrode;

a transformer having a primary winding and a secondary winding, said primary winding being connected to said switching element such that a chopped current flows in one direction therethrough; and smoothing means connected to the secondary winding of said transformer to smooth the voltage developed thereacross;

said control unit comprising a first control circuit for controlling the ON-OFF operation of the switching element of said main circuit, said first control circuit including first means for sensing the level of said d.c. voltage, second means for generating a pulse signal having said second frequency, third means for controlling a duty ratio of said pulse signal in response to the output of the first means in such a manner that the duty ratio becomes greater as the output of the first means become lower, and means for applying said pulse signal to the control electrode of said switching element, wherein said transformer comprises a magnetic core defining a magnetic path on which the primary and secondary windings are wound, said magnetic path including a permanent magnet to provide a predetermined magnetic bias with respect to magnetic flux due to a current flowing through the primary winding.

21. A d.c. power supply as defined in claim 1 or 2, wherein said third means includes a flip-flop having a set terminal coupled to receive the output of said second means to produce a control pulse in response to a pulse from said second means, and said flip-flop further having a reset terminal coupled to the junction of a capacitor and the output of said first means to reset the flip-flop when the charge on the capacitor from the voltage level detected by said first means reaches a predetermined level.

* * * * *